United States Patent
Bauer et al.

(10) Patent No.: US 10,110,631 B2
(45) Date of Patent: Oct. 23, 2018

(54) INTRODUCING ENCRYPTION, AUTHENTICATION, AND AUTHORIZATION INTO A PUBLICATION AND SUBSCRIPTION ENGINE

(75) Inventors: Daniel N. Bauer, Birmensdorf (CH); Sean G. Rooney, Alpes-Maritimes (FR)

(73) Assignee: International Business Machines Corporation, Armonk, NY (US)

( * ) Notice: Subject to any disclaimer, the term of this patent is extended or adjusted under 35 U.S.C. 154(b) by 1628 days.

(21) Appl. No.: 12/369,885

(22) Filed: Feb. 12, 2009

(65) Prior Publication Data
US 2010/0205427 A1    Aug. 12, 2010

(51) Int. Cl.
*H04L 29/06*    (2006.01)

(52) U.S. Cl.
CPC ........ *H04L 63/166* (2013.01); *H04L 63/0884* (2013.01); *H04L 63/101* (2013.01)

(58) Field of Classification Search
CPC . G06F 21/10; G11B 20/00086; H04L 63/166; H04L 63/0428; H04L 63/101
USPC .......................................... 713/151; 726/26
See application file for complete search history.

(56) References Cited

U.S. PATENT DOCUMENTS

| | | | |
|---|---|---|---|
| 6,158,007 A | 12/2000 | Moreh et al. | |
| 6,256,664 B1* | 7/2001 | Donoho et al. | 709/204 |
| 6,263,362 B1* | 7/2001 | Donoho et al. | 709/207 |
| 7,131,000 B2 | 10/2006 | Bradee | |
| 7,246,150 B1* | 7/2007 | Donoho et al. | 709/204 |
| 7,376,832 B2 | 5/2008 | Diep et al. | |
| 2003/0005117 A1 | 1/2003 | Kang et al. | |
| 2003/0144894 A1* | 7/2003 | Robertson et al. | 705/8 |
| 2004/0019645 A1* | 1/2004 | Goodman et al. | 709/206 |
| 2004/0122906 A1* | 6/2004 | Goodman et al. | 709/206 |
| 2004/0128353 A1* | 7/2004 | Goodman et al. | 709/204 |
| 2004/0250060 A1 | 12/2004 | Diep et al. | |
| 2005/0044197 A1* | 2/2005 | Lai | 709/223 |
| 2005/0050354 A1 | 3/2005 | Gociman | |
| 2005/0273499 A1* | 12/2005 | Goodman et al. | 709/206 |
| 2006/0036679 A1* | 2/2006 | Goodman et al. | 709/203 |

(Continued)

FOREIGN PATENT DOCUMENTS

EP    1571805 A1    9/2005

OTHER PUBLICATIONS

Wirth, Securing the MQTT Publish-Subscribe Protocol, University of Zurich, Switzerland, Jul. 2006.

(Continued)

*Primary Examiner* — Tamara T Kyle
(74) *Attorney, Agent, or Firm* — Daniel P. Morris; Ryan, Mason & Lewis, LLP

(57) ABSTRACT

A plurality of protocol stacks are deployed. Each of the protocol stacks includes a plurality of composable protocol modules, and each of the composable protocol modules implements common interfaces. It is detected that a first given one of a plurality of clients wishes to connect to a publication-subscription engine and it is determined whether the first given one of the plurality of clients is to be connected in a secure manner. Responsive to determining that the first given one of the plurality of clients is to be connected in the secure manner, an encrypted instance of a first appropriate one of the plurality of protocol stacks is instantiated to effectuate the secure connection. The first given one of the plurality of clients is authenticated and authorized.

18 Claims, 8 Drawing Sheets

(56) References Cited

U.S. PATENT DOCUMENTS

| | | | |
|---|---|---|---|
| 2006/0155578 | A1 | 7/2006 | Eisenberger et al. |
| 2006/0209868 | A1* | 9/2006 | Callaghan ................. 370/428 |
| 2007/0112574 | A1* | 5/2007 | Greene ........................ 705/1 |
| 2007/0150814 | A1* | 6/2007 | Morris ...................... 715/730 |
| 2007/0156919 | A1* | 7/2007 | Potti et al. ................ 709/238 |
| 2007/0208702 | A1* | 9/2007 | Morris .......................... 707/3 |
| 2007/0263658 | A1* | 11/2007 | Ung et al. ................. 370/466 |
| 2008/0010352 | A1* | 1/2008 | Donoho et al. ........... 709/206 |
| 2008/0066181 | A1* | 3/2008 | Haveson et al. ............ 726/26 |
| 2008/0120337 | A1* | 5/2008 | Fry ........................ 707/104.1 |
| 2008/0133646 | A1* | 6/2008 | Azulai ....................... 709/202 |
| 2008/0140709 | A1 | 6/2008 | Sundstrom |
| 2008/0141274 | A1 | 6/2008 | Bhogal et al. |
| 2010/0071053 | A1* | 3/2010 | Ansari et al. ............. 709/206 |
| 2010/0144383 | A1* | 6/2010 | Berger et al. ............. 455/521 |
| 2010/0146101 | A1* | 6/2010 | Morris ...................... 709/224 |
| 2010/0169263 | A1* | 7/2010 | Korpman et al. ........... 706/50 |
| 2010/0235433 | A1* | 9/2010 | Ansari et al. ............. 709/203 |

OTHER PUBLICATIONS

PCT International Search Report and Written Opinion, dated May 14, 2013, for counterpart PCT Application PCT/US2009/042286.
Sunil M. George et al., "Using the New Features in WebSphere Message Broker V6.1," IBM Redpaper, Jan. 2009, 146 pages.
Extended European Search Report dated May 14, 2013, including the supplemental European Search Report and European Search Opinion, 7 pages.
Applicant Response to the European Search Opinion, dated Jul. 26, 2013, 38 pages.

\* cited by examiner

INTRODUCING ENCRYPTION, AUTHENTICATION, AND AUTHORIZATION INTO A PUBLICATION AND SUBSCRIPTION ENGINE

FIELD OF THE INVENTION

The present invention relates to the electrical, electronic and computer arts, and, more particularly, to security features and the like.

BACKGROUND OF THE INVENTION

Publish/Subscribe is a method by which data is organized on topics, such that publishers publish on topics and subscribers subscribe to them. Typically, all messages published by a publisher on a topic are received by all subscribers to that topic. In at least some instances, publishers and subscribers are unaware of each other's identities, allowing a very flexible form of communication. A range of current products, dedicated to different market areas, support the publish/subscribe ("pub/sub") abstraction. In particular, the WebSphere® MQ (WSMQ) network communication software product, available from International Business Machines Corporation, Armonk, N.Y., USA, is a large system supporting a sophisticated set of operations such as fail over, transactional semantic, and non-repudiation, suitable for use in data server centers, for example, for handling banking transactions.

On the other hand, MQ Telemetry Transport (MQTT) is a light weight pub/sub mechanism suitable for use on low-level devices. In MQTT, clients (either publishers or subscribers) connect to a broker (such as IBM MicroBroker software). The broker then supports the pub/sub abstraction. MQTT supports both a "push" and "pull" model of pub/sub. The push model is as described in the previous paragraph. In the pull model, publishers publish to named queues and subscribers explicitly remove messages from those queues. In the push model, 0 to N subscribers may receive a given message, while in the pull model exactly one does.

SUMMARY OF THE INVENTION

Principles of the invention provide techniques for introducing encryption, authentication, and authorization into a publication and subscription engine. In one aspect, an exemplary method (which can be computer-implemented) for controlling interactions between a publication-subscription engine and a plurality of clients includes the step of deploying a plurality of protocol stacks, each of the protocol stacks comprising a plurality of composable protocol modules, each of the composable protocol modules implementing common interfaces. Additional steps include detecting that a first given one of the plurality of clients wishes to connect to the publication-subscription engine; and determining whether the first given one of the plurality of clients is to be connected in a secure manner. Responsive to determining that the first given one of the plurality of clients is to be connected in the secure manner, an additional step includes instantiating an encrypted instance of a first appropriate one of the plurality of protocol stacks to effectuate the secure connection. Further steps include authenticating the first given one of the plurality of clients; and authorizing the first given one of the plurality of clients.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (ii) a combination of hardware and software modules; any of (i)-(iii) implement the specific techniques set forth herein, and the software modules are stored in a tangible computer-readable storage medium (or multiple such media).

One or more embodiments of the invention may offer one or more of the following technical benefits:

ability to dynamically repudiate the access rights of a client on a given topic while preserving the semantic of the MQTT protocol;

ability to support multiple different authentication mechanism from multiple clients simultaneously.

These and other features, aspects and advantages of the present invention will become apparent from the following detailed description of illustrative embodiments thereof, which is to be read in connection with the accompanying drawings.

DETAILED DESCRIPTION OF PREFERRED EMBODIMENTS

Aspects of the invention enable users of a publish/subscribe mechanism to be authenticated and authorized simply and efficiently. Discussion will be had herein with regard to reading and writing from topics, to describe the push model, and reading and writing from queues, to describe the pull model. Topics and queues are hierarchically named within the publication/subscription engine, also referred to herein as the broker.

Light weight pub/sub mechanisms, such as MQTT, are typically designed to run on low-end devices, so they do not support the wide range of operations of network communication software products such as WSMQ. In MQTTv3, anyone can connect to a broker and publish and/or subscribe to any topic. In MQTTv4, a password was introduced in the protocol, but the MicroBroker software ignored it. These facts are illustrative of situations that can be advantageously addressed with aspects of the invention.

By way of a non-limiting example, in terms of applicability to light weight mechanisms on low end devices, in a network where there may be hundreds or thousands of devices (for example a sensor network), it may not make sense to store a password or certificate on each device, as this is quite a large management burden. Instead, authentication could be performed using other information, on the MAC address of the card, or the latency in the time it takes to communicate with the sensors, or any other aspect.

Aspects of the invention implement a full range of security features for lightweight pub/sub mechanisms; such features may advantageously be introduced into a simple pub/sub broker without compromising efficiency.

Security is a large field covering many diverse activities. Encryption ensures that a third party cannot observe the content of the information being carried across an unprotected channel. Authentication ensures that one party in a communication exchange can identify itself securely to another. Authorization ensures that an identified party is authorized to perform a particular operation. Some applications require that all communication to and from the broker be encrypted, that all parties be authenticated, and that read and writes to topics and queues be authorized.

Non-limiting examples follow of how such features can be introduced into the lightweight publication and subscription engine (broker).

Encryption

Figure 1:
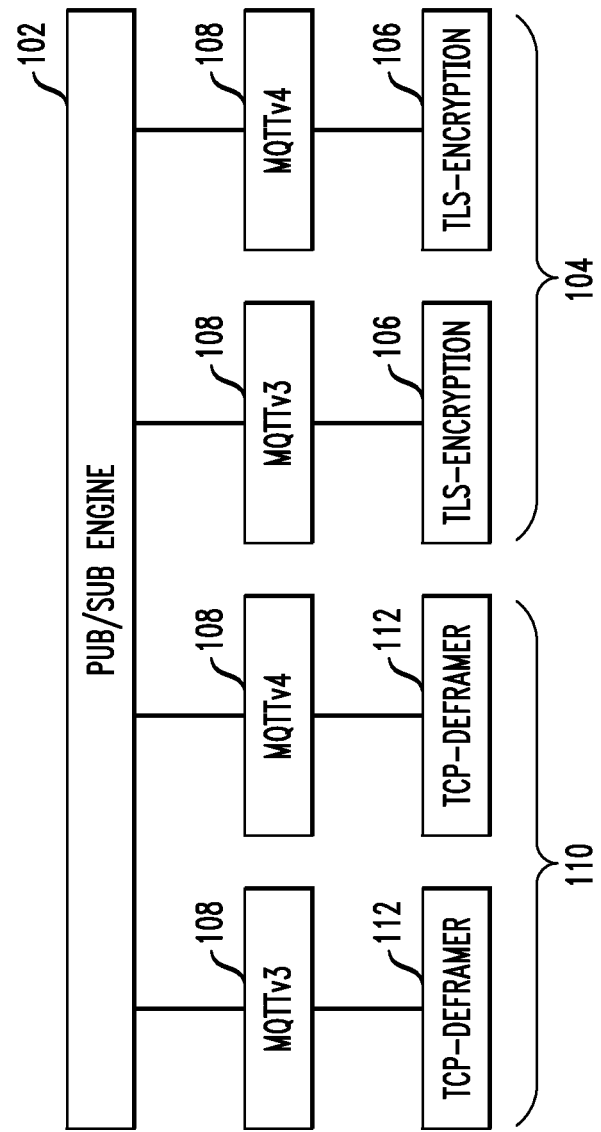
FIG. 1 shows composable protocol stacks, according to an aspect of the invention.

The techniques of ensuring encryption are well known per se to those versed in the art. In particular the Transport Layer Security/Secure Sockets Layer (TLS/SSL) protocol is a widely used implementation of Diffie-Hellman key exchange. Aspects of the invention, in regard to encryption, address techniques by which encryption can be activated and deactivated. With reference to FIG. 1, the broker 102 can be used in both secure and non-secure mode. The latter is more efficient, as encryption is computationally demanding. One or more embodiments of the invention employ composable protocol modules, to allow a system administrator to determine when and for which clients encryption should be used. In this model, different layers in the protocol stack are connected together like a child's interlocking toy blocks, by ensuring that all protocol modules, regardless of their location in the stack, implement the same interfaces. This enables simple composition of one or more encrypted stacks 104 by joining an SSL module 106 with the MQTT module 108, and a clear text (non-encrypted) stack 110 by joining a TCP module 112 with MQTT 108. The MQTT module 108 is identical in both cases. The MQTT modules are non-limiting examples of composable protocol modules.

Figure 2:
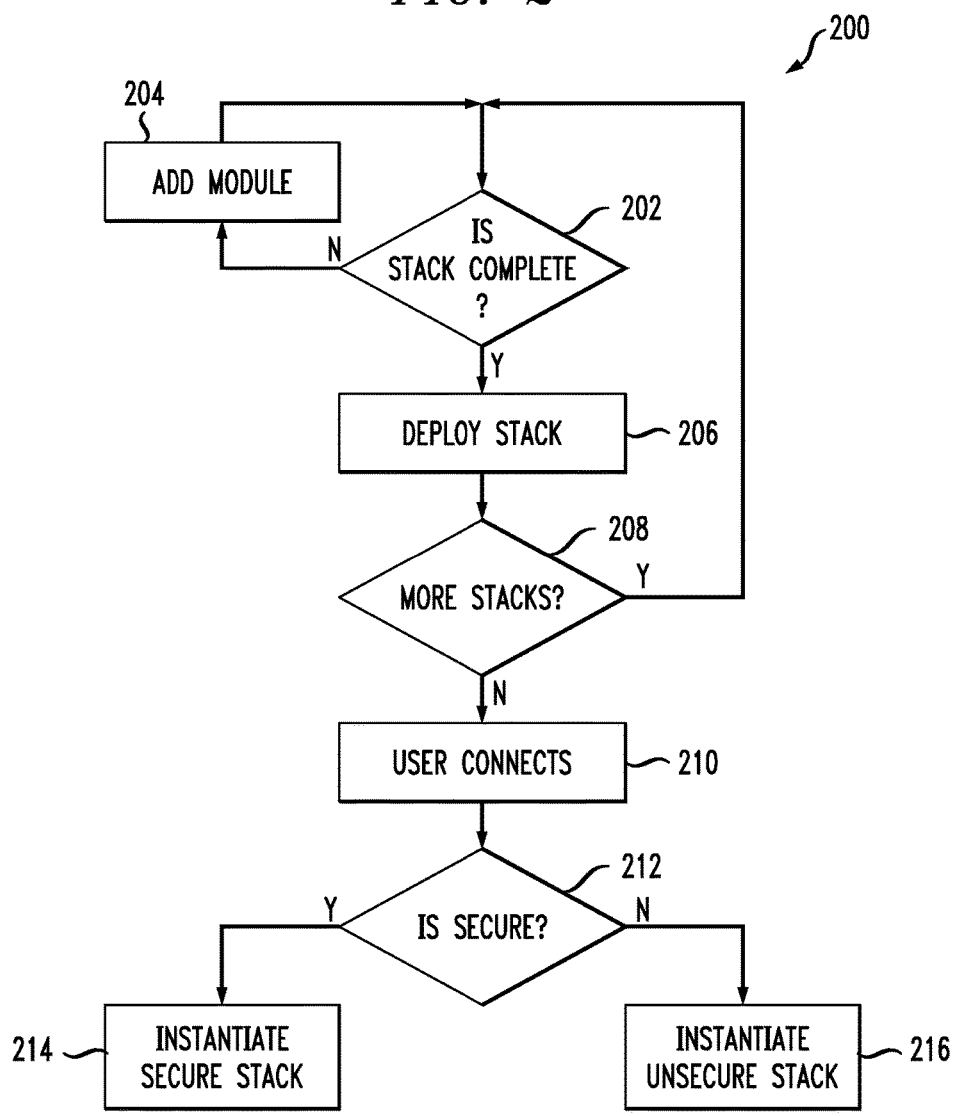
FIG. 2 is a flow chart of dynamic protocol composition, according to another aspect of the invention.

FIG. 2 shows a flow-chart 200 of how stacks are dynamically composed. A protocol stack is generated by resolving module after module, until the stack is complete. The stack is then deployed and ready to use. When a new client connects, the corresponding stack is instantiated based on the global security setting. In particular, as per decision block 202 and blocks 204 and 206, continue adding modules until a stack is complete; then, deploy the stack. As per decision block 208, repeat the process if there are more stacks to be completed ("Y" branch). In block 210, the user connects and control flows to decision block 212, where a determination is made whether the stack is to be secure, as per the global security setting. If secure ("Y" branch), the secure stack is instantiated in block 214, while if un-secure ("N" branch), the un-secure stack is instantiated in block 216.

Authentication

Figure 3:
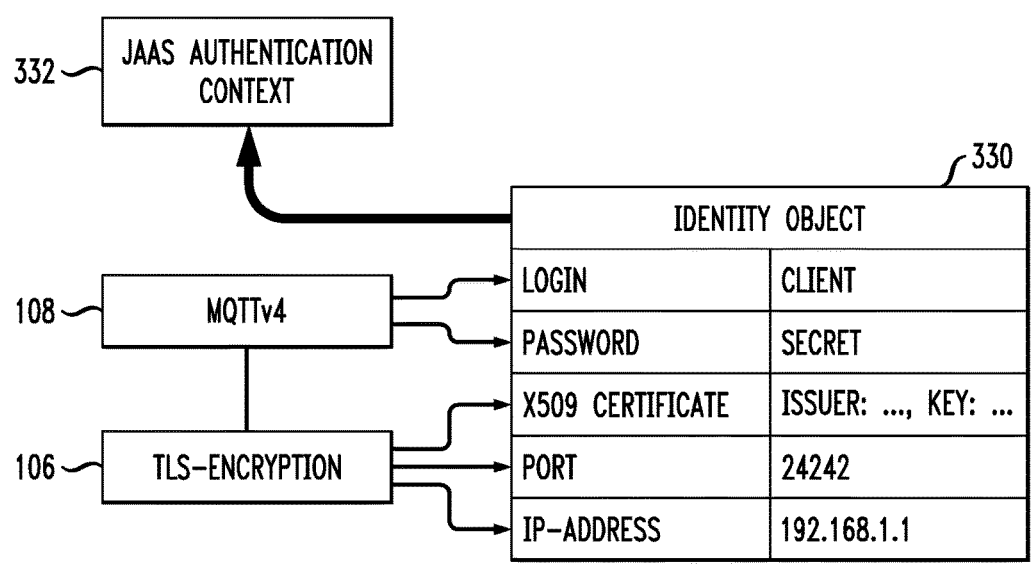
FIG. 3 depicts authentication using layer-specific information, according to still another aspect of the invention.

With reference to FIG. 3, in the simplest possible authentication mechanism, a password is sent from the client to the broker, and the broker authenticates the client if it corresponds to the recorded password for that client. Another common technique of authenticating clients is through the use of certificates signed by a trusted entity that only the client can possess. There are many different ways a client can be authenticated and these are appropriate in different contexts. This is taken into account in the standard JAAS (Java Authentication and Authorization System), as multiple different techniques of achieving authentication can be combined using administrator-defined rules. However, the technique by which the authentication information is gathered and made available is not defined by JAAS. In the context of the broker, define a general purpose identity object 330 that every level in the composable protocol stack contributes to. This object 330 is provided to JAAS authentication context 332. So, for example, the network layer can identify the internet protocol (IP) address of the client, a contact layer can give a thumb print, the secure socket layer (SSL) the supplied certificate, and the MQTT layer the password. This retains the flexibility of the stack, while allowing rules such as "those clients whose IP address is other than a trusted address, must supply a certificate to be authenticated."

Figure 4:
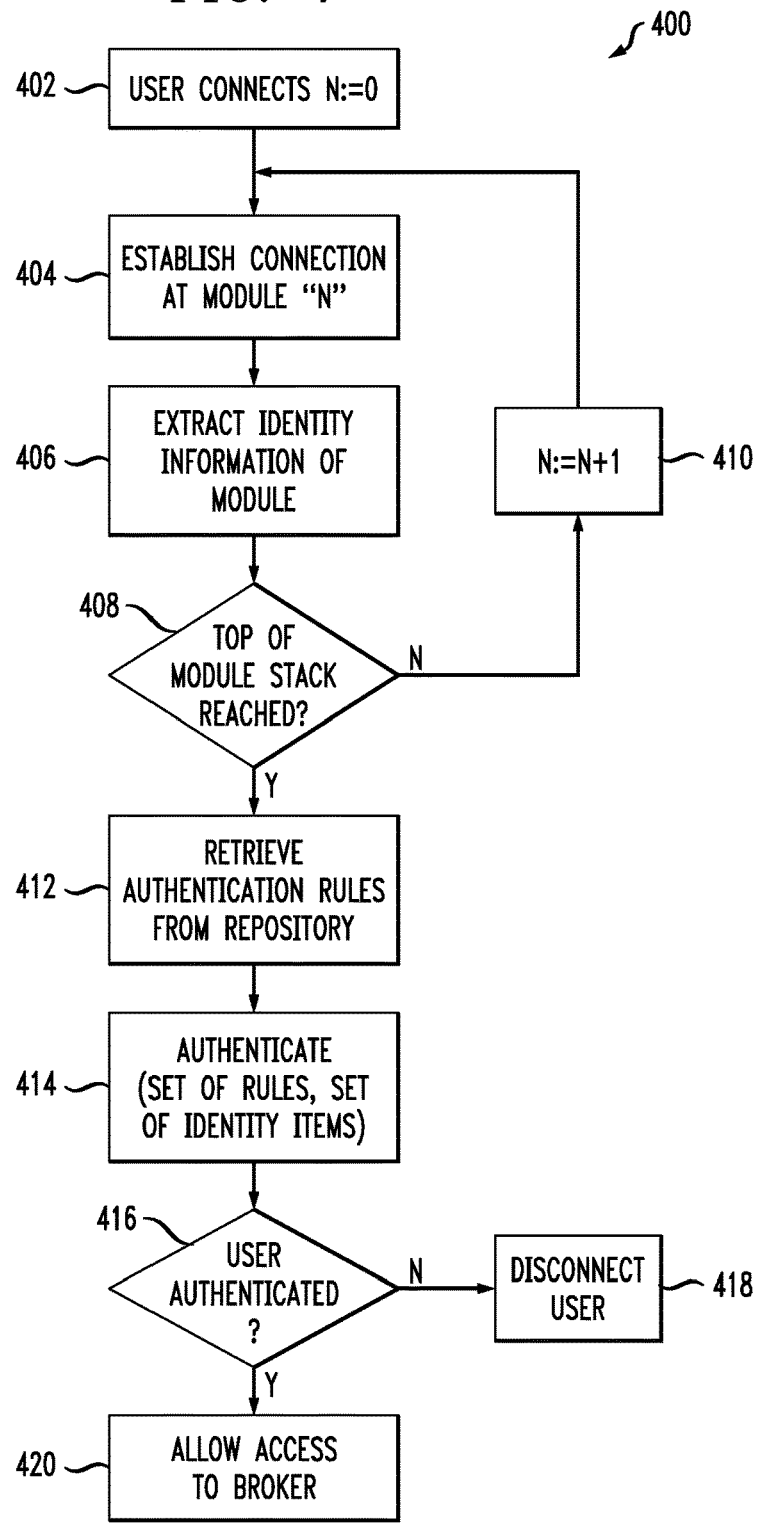
FIG. 4 is a flow chart of layer-based authentication, according to yet another aspect of the invention.

FIG. 4 shows the process, in flow chart 400, of how identity information is gathered and how authentication is then executed based on that information. In block 402, the user connects and N is initialized at zero. In block 404, establish a connection at module N. In block 406, extract identity information of the module. In decision block 408, determine whether the top of the module stack has been reached; if not ("N" branch), increment N in block 410 and return to block 404. Conversely, if the top of the module stack has been reached ("Y" branch), retrieve authentication rules from the repository in block 412 and authenticate in block 414, based upon a set of rules and a set of identity items. In decision block 416, determine if the user has been authenticated; if so ("Y" branch), allow access to the broker 102, as per block 420; if not ("N" branch), disconnect the user, as per block 418.

Authorization

JAAS also supplies an authorization mechanism, but this is inappropriate for the broker 102, as it authorizes a client to execute a piece of code. In consequence, the code base must reflect different authorization levels. This is neither conducive to efficiency nor to code simplicity. One or more embodiments of the invention employ a novel schema, which reuses the topic and queue naming schema to define the capability set for a client.

A resource (either queue or topic) name is structured hierarchically. This allows the use of wild card operations. Wild cards can only be used on subscriptions requests, as it does not make sense to publish on a wild card.

For example, one topic might be Europe/Switzerland/Zurich and another topic might be Europe/Switzerland/Geneva. Subscribers who subscribed to Europe/Switzerland/# would then receive all publications on any city in Switzerland.

It is possible to define four basic operations that a client can perform:
    Write to a topic
    Read from a topic Write to a Queue
Read from a Queue For each of these, define the capabilities of the client as a set of potentially wild-carded names. So, for example, a client might be given read access to Europe/# but write access to Europe/Switzerland/# and Europe/France/Paris.

Figure 5:
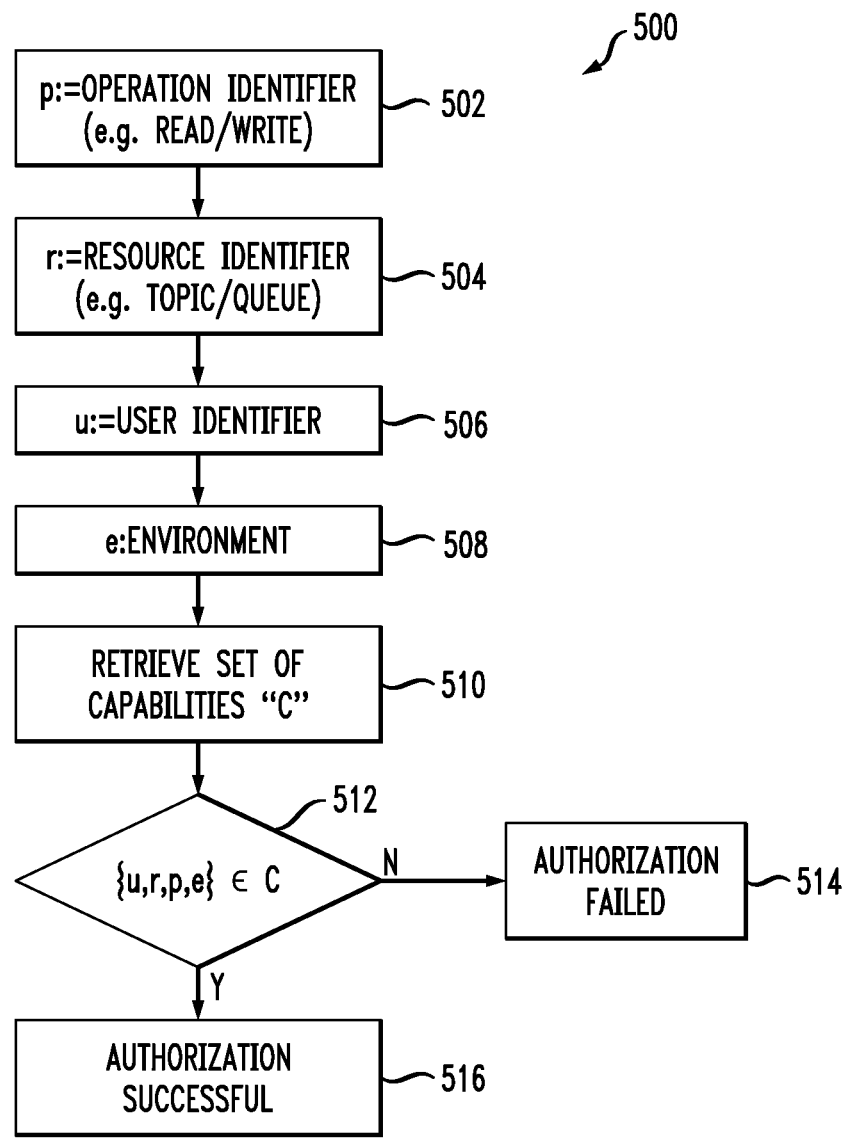
FIG. 5 is a flow chart of an authorization mechanism, according to a further aspect of the invention.

FIG. 5 shows the basic authorization procedure as a flow chart 500. The operation that a client wants to perform on a resource is checked against the capabilities that that client has. If the client lacks the capability to perform the operation, then authorization fails and the operation is not executed. Otherwise, the client will proceed. In particular, in block 502, obtain operation identifier p: to determine what operation the client wants to perform on a resource r: obtained in block 504. The user identifier u: and environment e: are obtained in blocks 506 and 508, respectively. The set of capabilities C corresponding to the client are retrieved in block 510, and in decision block 512, a determination is made whether the desired operation identifier p:, resource r:, user u:, and environment e: are contained in the retrieved capabilities C of the client. If so ("Y" branch), authorization is successful, as indicated at block 516, while if not ("N" branch), authorization fails, as at block 514.

Each time a client creates a publication or subscription right within the broker, the supplied name is matched against the capability set of the client for the appropriate operation. The supplied name should be a branch in the set of trees defined in the capability set. As both the supplied name and the capability set may be wild carded, use the following technique, expressed in pseudo-code:

```
Match(Name, Capability)
    IF Name.isEmpty( ) AND Capability.isEmpty( ) RETURN True
    IF Capability.head ( ) == "#"
        WHILE (Capability.tail( ).head( ) != Name.head( ))
            Name = Name.tail( );
    IF (Capability.head( ) == Name.head( )) RETURN
    Match(Name.tail( ),Capability.tail( ));
    RETURN False;
```

The technique is described recursively, but an equivalent and more efficient version can be implemented imperatively through the use of stacks. The stack-based approach allows 1,000,000 distinct capabilities with 20 levels in the naming hierarchy to be matched against a 20 level name in less than 1 ms on the target architecture (for example, a low-end server or personal computer (PC)). In the stack based approach, the "Capability" and "Name" are both used to generate a stack, containing distinct layers in the naming tree as well as wild cards. Both stacks are popped, and as long as the head elements match, the process continues. The semantic is the same as in the recursive call, but no recursion is used. Recursion is elegant for describing the process, but is not typically very efficient.

In some instances, it may be necessary to occasionally revoke capabilities on resources. It may be the case that the client was authenticated and has access to the resource before the right is revoked. In order to handle this case, distinguish between clients whose capabilities have and have not been changed since the start of the interaction with the broker; those that have not been changed using the normal protocol stack, but as to those that have been changed, a new module is added dynamically. This module checks, on a per-message basis, the capability set of the client, using the technique described above in pseudo-code.

Figure 6:
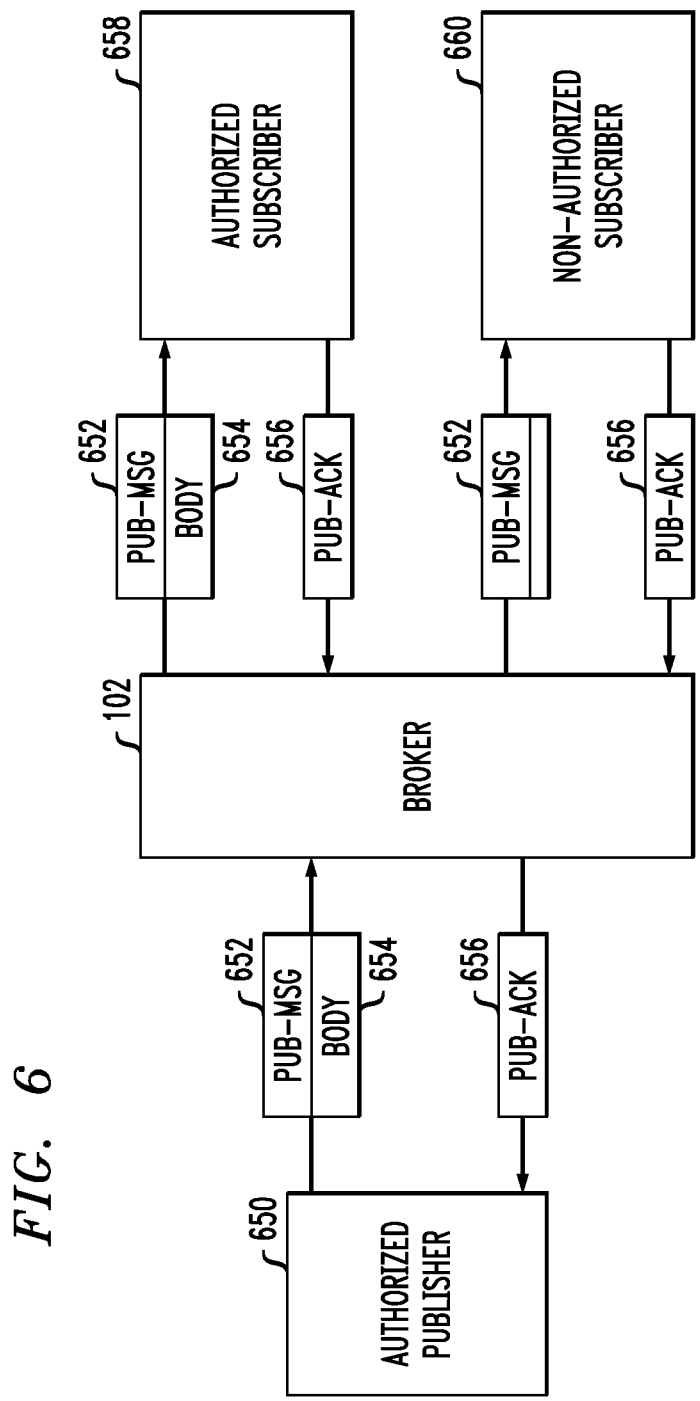
FIG. 6 shows maintaining message flow by removing the message body, according to an even further aspect of the invention.

Reference should now be had to FIG. 6. MQTT had different modes of interaction, some of which require that messages be acknowledged. The MQTT protocol has no provision for capabilities set. Simply dropping a message for which a client no longer had the appropriate rights would cause problems in the interaction with the MQTT modules, if the client was expected to acknowledge the message. This can be addressed, not by dropping the message, but simply removing its payload and adding an error flag into the header. A well-behaved receiver of such a message is then expected to disconnect from the resource. A badly behaved receiver may not disconnect, but would gain no benefit from so doing. Thus, as seen in FIG. 6, authorized publisher 650 submits publication message 652 with body 654 to broker 102, which acknowledges same with a publication acknowledgement 656. Message 652 with body 654 is sent to authorized subscriber 658, which return acknowledgement 656. Message 652 without body 654 is sent to non-authorized subscriber 660, which return acknowledgement 656.

One or more embodiments of the invention thus employ a dynamically composable protocol module stack to enable security within a messaging system such that:

1. the protocol modules, regardless of their nature, have a common interface, allowing them to be composed together to form a complete stack in arbitrary ways
2. the set of possible stacks are decided at configuration time
3. the system decides the most appropriate stack to use for a given client based on security requirements
4. one stack has an encrypted transport layer and the other does not.

In at least some instances, each protocol module supplies information about the remote client to an entity created at connection establishment, including:

1. the MAC address of the sender
2. the IP subnet and port of the sender
3. a certificate added by the sender
4. the password and user name of the sender.

Furthermore, in one or more embodiments, the information supplied by the protocol modules is used as part of the authentication process. Yet further, in at least some cases, use the name of the topics and/or queues to establish a capability set, in which read/write access is assigned to topics and/or queues using a set of names, such that an attempt in the control path to create a connection to a named topic/queue must 'match' the corresponding set of capabilities. Preferably, both: (i) the capability set and (ii) the named topic and/or queue may use wild cards.

In one or more instances, a new filter module is dynamically added in the data path of a client whose capabilities have been revoked, such that each message is checked to see if it is still authorized. This beneficially allows the checking to be carried out on a per-message basis in the case that the client's capability is reduced while a session is still active. In at least some cases, the filter removes the content of the message but adds an error flag to allow the normal protocol interaction to continue.

Figure 7:
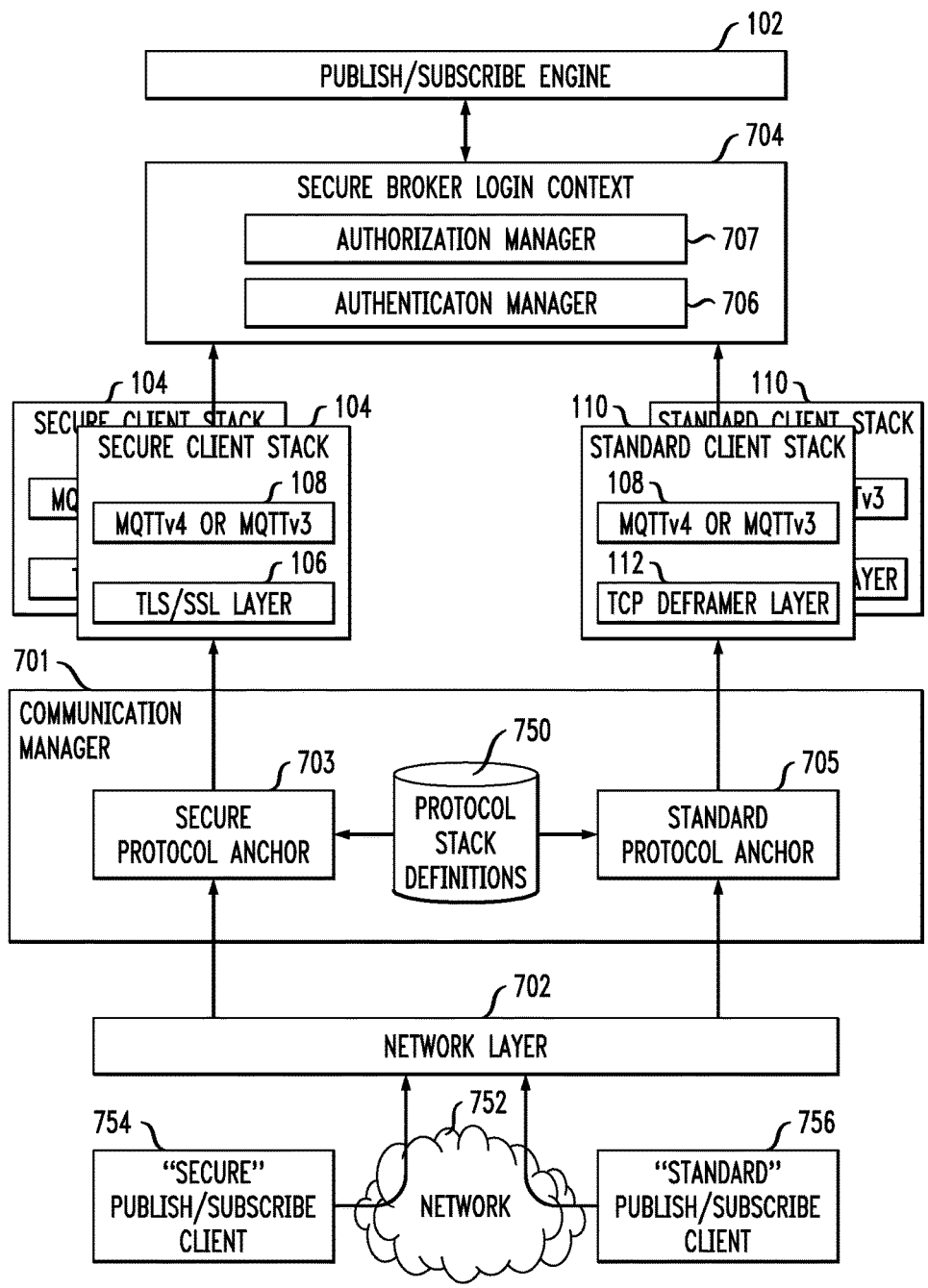
FIG. 7 is a block diagram of a non-limiting exemplary embodiment, according to an additional aspect of the invention.

FIG. 7 depicts a preferred but non-limiting embodiment of a system, according to an aspect of the invention, in the form of a block diagram. Secure pub/sub client 754 and standard pub/sub client 756 wish to interact with pub/sub engine 102. Clients 754, 756 interact with communication manager 701, over network 752. Such interaction is facilitated by network layer 702. Communication manager 701 includes secure protocol anchor 703, standard protocol anchor 705, and a repository of protocol stack definitions 750. Network layer 702 routes interactions from secure client 754 to secure protocol anchor 703, which retrieves appropriate protocol stack definitions from repository 750, to instantiate an instance of a secure client stack 104. Network layer 702 also routes interactions from standard client 756 to standard protocol anchor 705, which retrieves appropriate protocol stack definitions from repository 750 to instantiate an instance of a standard client stack 110. Stacks 104, 110 include elements 106, 108, 112 as described with regard to FIG. 1. Access of both the standard and secure clients to engine 102 is controlled by secure broker login context 704, including authentication manager 706 and authorization manager 707.

In view of the discussion thus far, it will be appreciated that, in general terms, one aspect of the invention is a method for controlling interactions between a publication-subscription engine 102 and a plurality of clients, such as clients 650, 658, 660, 754, 756. The method includes the step of deploying a plurality of protocol stacks, as per blocks 202-208 of FIG. 2. Each of the protocol stacks includes a plurality of composable protocol modules 108. Each of the composable protocol modules implements common interfaces. This step can be carried out, for example, using communication manager 701 in FIG. 7. Additional steps include detecting that a first given one of the plurality of clients wishes to connect to the publication-subscription engine, as in block 210, and determining whether the first given one of the plurality of clients is to be connected in a secure manner, as in block 212. These steps can be carried out, for example, using network layer 702 in FIG. 7.

A further step, as per the "Y" branch of decision block 212, is, responsive to determining that the first given one of the plurality of clients is to be connected in the secure manner, instantiating an encrypted instance of a first appropriate one of the plurality of protocol stacks (represented by one of the stacks 104) to effectuate the secure connection. This step can be carried out, for example, using secure protocol anchor 703 in FIG. 7. Further steps include authenticating the first given one of the plurality of clients (for example, as described with regard to FIGS. 3 and 4); and authorizing the first given one of the plurality of clients (for example, as described with regard to FIG. 5). These steps can be carried out, for example, using secure broker login context 704 in FIG. 7.

In one or more instances, an additional step includes detecting that a second given one of the plurality of clients wishes to connect to the publication-subscription engine (repeating block 210). Further additional steps can include determining whether the second given one of the plurality of clients is to be connected in the secure manner, by repeating block 212, and, responsive to determining that the second given one of the plurality of clients is not to be connected in the secure manner ("N" branch of block 212), instantiating a clear-text instance (represented by one of the stacks 110) of a second appropriate one of the plurality of protocol stacks to effectuate the non-secure connection, as per block 216. Step 216 can be carried out, for example, using Standard Protocol Anchor 705 in FIG. 7; the repeated steps can be carried out using the same modules or blocks as previously described. The second given one of the plurality of clients can be authenticated and authorized.

Preferably, the instantiating of the encrypted instance of the first appropriate one of the plurality of protocol stacks to effectuate the secure connection includes joining secure socket layer (or similar) modules 106 with the composable protocol modules 108 in the first appropriate one of the plurality of protocol stacks, using the common interfaces; and the instantiating of the clear-text instance of the second appropriate one of the plurality of protocol stacks to effectuate the non-secure connection comprises joining transfer control protocol (or similar) modules 112 with the composable protocol modules 108 in the second appropriate one of the plurality of protocol stacks, using the common interfaces. These steps can be carried out, for example, using communication manager 701 in FIG. 7.

The authenticating of the first given one of the plurality of clients can include, for example, extracting identity information for each of the composable protocol modules in the instantiated encrypted instance of the first appropriate one of the plurality of protocol stacks, as shown at blocks 402-410, as well as building a general purpose identity object 330 based upon the extracted identity information. These steps can be carried out, for example, using secure broker login context 704 in FIG. 7. Further possible steps include supplying the general purpose identity object 330 to the publication-subscription engine 102 (for example, to JAAS authentication context 332 thereof); and authenticating the first given one of the plurality of clients when the general purpose identity object 332 matches appropriate authentication rules, as per blocks 412-420. These steps can be carried out, for example, using authentication manager 706 in FIG. 7.

With reference again to FIG. 5, as per blocks 502-508, the first given one of the plurality of clients can be associated with a user u:, u: being a user identifier. Further, the authorizing of the first given one of the plurality of clients can include determining that the first given one of the plurality of clients wishes to perform an operation designated by p:, p: being an operation identifier; and determining that the operation is desired to be carried out in an environment e: in connection with a resource r:, r: being a resource identifier. As in block 510, an additional possible step includes retrieving a set of capabilities, C, associated with the first given one of the plurality of clients. Blocks 512-516 indicate authorizing the first given one of the plurality of clients when the parameters u:, r:, p:, and e: are contained in C. Resource identifier r: can identify, for example, one of a topic and a queue. Operation identifier p: can identify, for example, one of a read operation and a write operation. These steps can be carried out, for example, using authorization manager 707 in FIG. 7.

Recalling the description of FIG. 6, in some cases, an additional step includes detecting that, subsequent to the authorizing the first given one of the plurality of clients, the first given one of the plurality of clients 660 has had a change in the set of capabilities, C, associated with the first given one of the plurality of clients. This can be carried out, for example, with authorization manager 707. When it is detected (for example, by the authorization manager 707) that the first given one of the plurality of clients wishes to perform another operation, which is not permitted by the changed set of capabilities; drop the payload 654 of a message 652 associated with the non-permitted operation and place an error flag into a header of the message associated with the non-permitted operation. The payload can be dropped, for example, by MQTT protocol module 108.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 8:
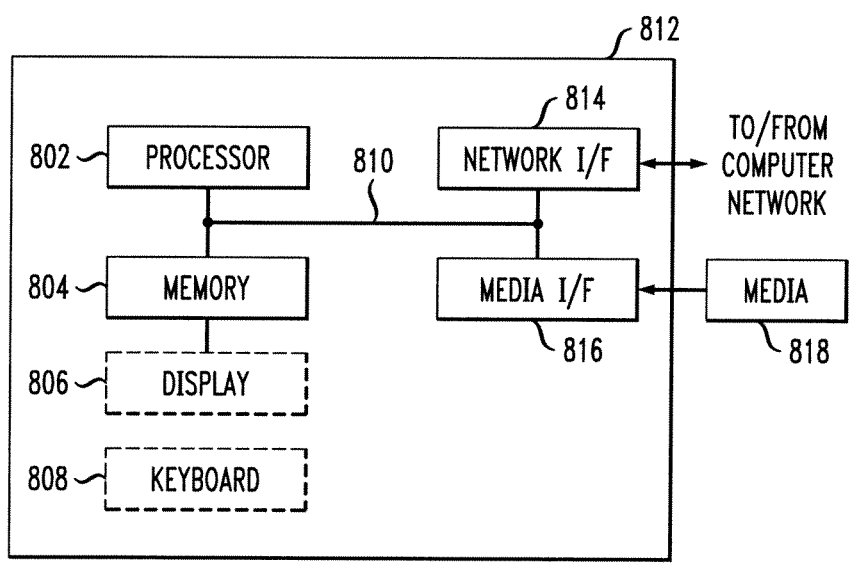
FIG. 8 depicts a computer system that may be useful in implementing one or more aspects and/or elements of the invention.

One or more embodiments can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 818) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 804), magnetic tape, a removable computer diskette (for example media 818), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code will include at least one processor 802 coupled directly or indirectly to memory elements 804 through a system bus 810. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in FIG. 7 (for example, blocks 102, 104, 106, 108, 110, 112, 701-707, 750; block 750 could include, for example, entries in a database). The method steps can then be carried out using the distinct software modules and/or sub-modules of the system, as described above, executing on a hardware processor. Further, a computer program product can include a tangible computer-readable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
    deploying a publication-subscription system comprising a communication manager module, an authentication manager module, an authorization manager module, and a publication-subscription engine, wherein the communication manager module maintains a protocol module repository which comprises a plurality of protocol modules, wherein the plurality of protocol modules comprises different publish/subscribe protocol modules, encrypted transport layer modules, and non-encrypted transport layer modules, but wherein each protocol module implements a common interface;
    detecting by the communication manager module that a client wishes to connect to the publication-subscription engine, wherein the client comprises one of a publishing client and a subscribing client;
    responsive to the detecting, determining by the communication manager module whether said client is to be connected to the publication-subscription engine in a secure manner or a non-secure manner;
    dynamically configuring, by the communication manager module, a protocol stack for the client using one of the different publish/subscribe protocol modules in the protocol module repository, and one of the encrypted transport layer modules or one of the non-encrypted transport layer modules in the protocol module repository, based on said determination of whether said client is to be connected to the publication-subscription engine in a secure manner or a non-secure manner, wherein dynamically configuring comprises:
        responsive to determining that said client is to be connected in said secure manner, dynamically configuring a secure protocol stack by combining one of the different publish/subscribe protocol modules with at least one of the encrypted transport layer modules of the deployed protocol modules;
        responsive to determining that said client is to be connected in said non-secure manner, dynamically configuring a non-secure protocol stack by combining one of the different publish/subscribe protocol modules with at least one of the non-encrypted transport layer modules of the deployed protocol modules; and
        generating an identity object associated with said client, wherein the identity object comprises a collection of information obtained from each protocol module of the dynamically configured protocol stack for the client, wherein the identity object serves as a unique identifier of the client, wherein the collection of information of the identify object comprises at least one or more of a client password, a client MAC address, a certificate of the client, an IP address of the client, and a port number of the client;
    authenticating said client, by the authentication manager module, using the identity object associated with said client, wherein the authenticating comprises comparing the collection of information of the identity object against authentication rules, and authenticating the client when the collection of information matches the authentication rules;
    performing an authorizing process by the authorization manager module to authorize said client; and
    enabling communication between the client and the publication-subscription engine using the dynamically configured protocol stack for the client, if said client is authenticated and authorized.

2. The method of claim 1, wherein at least one of the encrypted transport layer modules of the deployed protocol modules comprises a SSL (secure sockets layer) module, and at least one of the non-encrypted transport layer modules of the deployed protocol modules comprises a TCP (transfer control protocol) module;

wherein dynamically configuring a secure protocol stack comprises the communication manager module combining one of the different publish/subscribe protocol modules with the SSL module using the common interface; and wherein dynamically configuring a non-secure protocol stack comprises the communication manager module combining one of the different publish/subscribe protocol modules with the TCP module using the common interface.

3. The method of claim 1, wherein the authorizing process performed by the authorization manager module to authorize said client, comprises:

receiving a client request from said client, wherein said client is associated with a user u:, u: being a user identifier; and wherein said client request indicates that said client wishes to perform an operation designated by p:, p: being an operation identifier;

determining that said operation is desired to be carried out in an environment e: in connection with a resource r:, r: being a resource identifier;

retrieving a set of capabilities, C, associated with said client; and authorizing said client when said parameters u:, r:, p:, and e: are contained in C.

4. The method of claim 3, wherein said resource identifier r: identifies one of a topic and a queue.

5. The method of claim 3, wherein said operation identifier p: identifies one of a read operation and a write operation.

6. The method of claim 3, further comprising:

detecting, by said authorization manager module, that, subsequent to said authorizing of said client, said client has had a change in said set of capabilities, C, associated with said client;

detecting, by said authorization manager module, that said client wishes to perform another operation, which is not permitted by said changed set of capabilities; and responsive to detecting that said client wishes to perform said non-permitted operation, dropping a payload of a message associated with said non-permitted operation and placing an error flag into a header of said message associated with said non-permitted operation.

7. A computer program product comprising a non-transitory computer-readable recordable storage medium comprising computer executable program instructions which are executable by a computer to implement a method comprising:

deploying a publication-subscription system comprising a communication manager module, an authentication manager module, an authorization manager module, and a publication-subscription engine, wherein the communication manager module maintains a protocol module repository which comprises a plurality of protocol modules, wherein the plurality of protocol modules comprises different publish/subscribe protocol modules, encrypted transport layer modules, and non-encrypted transport layer modules, but wherein each protocol module implements a common interface;

detecting by the communication manager module that a client wishes to connect to the publication-subscription engine, wherein the client comprises one of a publishing client and a subscribing client;

responsive to the detecting, determining by the communication manager module whether said client is to be connected to the publication-subscription engine in a secure manner or a non-secure manner;

dynamically configuring, by the communication manager module, a protocol stack for the client using one of the different publish/subscribe protocol modules in the protocol module repository, and one of the encrypted transport layer modules or one of the non-encrypted transport layer modules in the protocol module repository, based on said determination of whether said client is to be connected to the publication-subscription engine in a secure manner or a non-secure manner, wherein dynamically configuring comprises:

responsive to determining that said client is to be connected in said secure manner, dynamically configuring a secure protocol stack by combining one of the different publish/subscribe protocol modules with at least one of the encrypted transport layer modules of the deployed protocol modules;

responsive to determining that said client is to be connected in said non-secure manner, dynamically configuring a non-secure protocol stack by combining one of the different publish/subscribe protocol modules with at least one of the non-encrypted transport layer modules of the deployed protocol modules; and generating an identity object associated with said client, wherein the identity object comprises a collection of information obtained from each protocol module of the dynamically configured protocol stack for the client, wherein the identity object serves as a unique identifier of the client, wherein the collection of information of the identify object comprises at least one or more of a client password, a client MAC address, a certificate of the client, an IP address of the client, and a port number of the client;

authenticating said client, by the authentication manager module, using the identity object associated with said client, wherein the authenticating comprises comparing the collection of information of the identity object against authentication rules, and authenticating the client when the collection of information matches the authentication rules;

performing an authorizing process by the authorization manager module to authorize said client; and enabling communication between the client and the publication-subscription engine using the dynamically configured protocol stack for the client, if said client is authenticated and authorized.

8. The computer program product of claim 7, wherein at least one of the encrypted transport layer modules of the deployed protocol modules comprises a SSL (secure sockets layer) module, and at least one of the non-encrypted transport layer modules of the deployed protocol modules comprises a TCP (transfer control protocol) module;

wherein dynamically configuring a secure protocol stack comprises the communication manager module combining one of the different publish/subscribe protocol modules with the SSL module using the common interface; and wherein dynamically configuring a non-secure protocol stack comprises the communication manager module combining one of the different publish/subscribe protocol modules with the TCP module using the common interface.

9. The computer program product of claim 7, wherein the authorizing process performed by the authorization manager module to authorize said client, comprises:

receiving a client request from said client, wherein said client is associated with a user u:, u: being a user identifier, and wherein said client request indicates that said client wishes to perform an operation designated by p:, p: being an operation identifier;
determining that said operation is desired to be carried out in an environment e: in connection with a resource r:, r: being a resource identifier;
retrieving a set of capabilities, C, associated with said client; and
authorizing said client-when said parameters u:, r:, p:, and e: are contained in C.

10. The computer program product of claim 9, wherein said resource identifier r: identifies one of a topic and a queue.

11. The computer program product of claim 9, wherein said operation identifier p: identifies one of a read operation and a write operation.

12. The computer program product of claim 9, wherein the method further comprises:
detecting, by said authorization manager module, that, subsequent to said authorizing of said client, said client has had a change in said set of capabilities, C, associated with said client;
detecting, by said authorization manager module, that said client wishes to perform another operation, which is not permitted by said changed set of capabilities; and
responsive to detecting that said client wishes to perform said non-permitted operation, dropping a payload of a message associated with said non-permitted operation and placing an error flag into a header of said message associated with said non-permitted operation.

13. An apparatus comprising:
a memory configured to store program instructions; and
at least one processor, coupled to said memory, and configured to execute the program instructions to implement a method comprising:
deploying a publication-subscription system comprising a communication manager module, an authentication manager module, an authorization manager module, and a publication-subscription engine, wherein the communication manager module maintains a protocol module repository which comprises a plurality of protocol modules, wherein the plurality of protocol modules comprises different publish/subscribe protocol modules, encrypted transport layer modules, and non-encrypted transport layer modules, but wherein each protocol module implements a common interface;
detecting by the communication manager module that a client wishes to connect to the publication-subscription engine, wherein the client comprises one of a publishing client and a subscribing client;
responsive to the detecting, determining by the communication manager module whether said client is to be connected to the publication-subscription engine in a secure manner or a non-secure manner;
dynamically configuring, by the communication manager module, a protocol stack for the client using one of the different publish/subscribe protocol modules in the protocol module repository, and one of the encrypted transport layer modules or one of the non-encrypted transport layer modules in the protocol module repository, based on said determination of whether said client is to be connected to the publication-subscription engine in a secure manner or a non-secure manner, wherein dynamically configuring comprises:
responsive to determining that said client is to be connected in said secure manner, dynamically configuring a secure protocol stack by combining one of the different publish/subscribe protocol modules with at least one of the encrypted transport layer modules of the deployed protocol modules;
responsive to determining that said client is to be connected in said non-secure manner, dynamically configuring a non-secure protocol stack by combining one of the different publish/subscribe protocol modules with at least one of the non-encrypted transport layer modules of the deployed protocol modules; and
generating an identity object associated with said client, wherein the identity object comprises a collection of information obtained from each protocol module of the dynamically configured protocol stack for the client, wherein the identity object serves as a unique identifier of the client, wherein the collection of information of the identify object comprises at least one or more of a client password, a client MAC address, a certificate of the client, an IP address of the client, and a port number of the client;
authenticating said client, by the authentication manager module, using the identity object associated with said client, wherein the authenticating comprises comparing the collection of information of the identity object against authentication rules, and authenticating the client when the collection of information matches the authentication rules;
performing an authorizing process by the authorization manager module to authorize said client; and
enabling communication between the client and the publication-subscription engine using the dynamically configured protocol stack for the client, if said client is authenticated and authorized.

14. The apparatus of claim 13, wherein the authorizing process performed by the authorization manager module to authorize said client, comprises:
receiving a client request from said client, wherein said client is associated with a user u:, u: being a user identifier, and wherein said client request indicates that said client wishes to perform an operation designated by p:, p: being an operation identifier;
determining that said operation is desired to be carried out in an environment e: in connection with a resource r:, r: being a resource identifier;
retrieving a set of capabilities, C, associated with said client; and
authorizing said client-when said parameters u:, r:, p:, and e: are contained in C.

15. The apparatus of claim 14, wherein said resource identifier r: identifies one of a topic and a queue.

16. The apparatus of claim 14, wherein said operation identifier p: identifies one of a read operation and a write operation.

17. The apparatus of claim 14, further comprising:
detecting, by said authorization manager module, that, subsequent to said authorizing of said client, said client has had a change in said set of capabilities, C, associated with said client;
detecting, by said authorization manager module, that said client wishes to perform another operation, which is not permitted by said changed set of capabilities; and
responsive to detecting that said client wishes to perform said non-permitted operation, dropping a payload of a message associated with said non-permitted operation and placing an error flag into a header of said message associated with said non-permitted operation.

18. The apparatus of claim 13, wherein at least one of the encrypted transport layer modules of the deployed protocol modules comprises a SSL (secure sockets layer) module, and at least one of the non-encrypted transport layer modules of the deployed protocol modules comprises a TCP (transfer control protocol) module;
    wherein dynamically configuring a secure protocol stack comprises the communication manager module combining one of the different publish/subscribe protocol modules with the SSL module using the common interface; and
    wherein dynamically configuring a non-secure protocol stack comprises the communication manager module combining one of the different publish/subscribe protocol modules with the TCP module using the common interface.

\* \* \* \* \*